Figure 1:
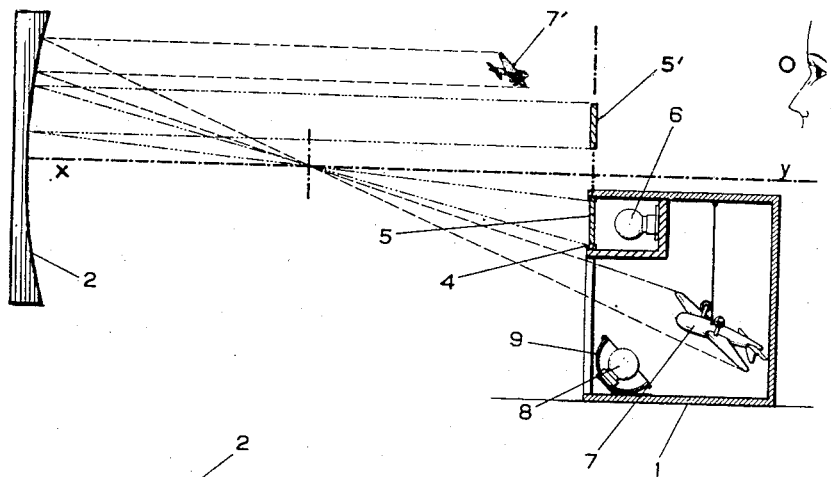

Nov. 27, 1951

F. SAUVAGÉ

2,576,147

APPARATUS FOR PROJECTING AERIAL IMAGES IN HIGH RELIEF

Filed Jan. 11, 1949

2 SHEETS—SHEET 1

INVENTOR
FERNAND SAUVAGÉ
BY

Nov. 27, 1951 — F. SAUVAGÉ — 2,576,147
APPARATUS FOR PROJECTING AERIAL IMAGES IN HIGH RELIEF

Filed Jan. 11, 1949 — 2 SHEETS—SHEET 2

INVENTOR
FERNAND SAUVAGÉ

Patented Nov. 27, 1951

2,576,147

UNITED STATES PATENT OFFICE 2,576,147

APPARATUS FOR PROJECTING AERIAL IMAGES IN HIGH RELIEF

Fernand Sauvagé, Paris, France

Application January 11, 1949, Serial No. 70,334
In France January 12, 1948

3 Claims. (Cl. 272—8)

It is well known that concave mirrors have the property of giving a real image of an object located beyond the focal plane of the mirror, or in other words, at a distance from the mirror greater than the focal distance of said mirror, said real image being inverted and being adapted to be received on a screen, and said image moreover being visible in space, in front of the mirror, to a suitably situated observer. For that reason, such an image is sometimes termed an aerial image.

The position and magnitude of such an image are respectively given, in the case of a spherical mirror, by the following equations:

$$\frac{1}{p}+\frac{1}{p'}=\frac{1}{f}=\frac{2}{R} \quad (1)$$

and $$\frac{i}{o}=\frac{p'}{p} \quad (2)$$

wherein $p$ is the distance from the object to the mirror, $p'$ is the distance from the image to the mirror, $f$ is the focal distance of the mirror, $R$ is the radius of the concave mirror, $i$ is the magnitude of the image and $o$ the magnitude of the object.

If the object is located above the central axis of the mirror, the aerial image will form below said axis while if the object is below the axis, the image thereof will form above the axis.

The aerial image thus produced is generally not very clear and is less brilliant when magnified, and is only visible for an observer situated within a definite narrow range of positions with respect to the mirror.

My invention provides an apparatus making it possible to produce aerial images having high relief characteristics and great brightness, thereby being readily visible.

In a first form of embodiment, my improved apparatus is essentially characterized in that it comprises, in combination with a concave mirror, a light box or casing in which an object from which it is desired to form an aerial image is arranged together with a light source serving to illuminate said object. The object may be illuminated by back reflection, if said object is made of an opaque material, or in transparency, if the object is a transparent one, in particular a transparent print or transparency.

The light source may comprise sunlight: in that case the light box enclosing the object or objects to be projected will comprise suitably arranged windows formed therein and preferably sealed by a ground glass plate.

The invention is applicable both to stationary and moving images. Thus for instance there may be provided within the light box a device for feeding a moving picture film, or alternatively for displaying at a suitable rate of frequency a series of motion picture images, the moving images thus produced being picked up by the concave mirror to form therefrom an inverted aerial image. Images in color may likewise be produced by similar means.

Figure 2:
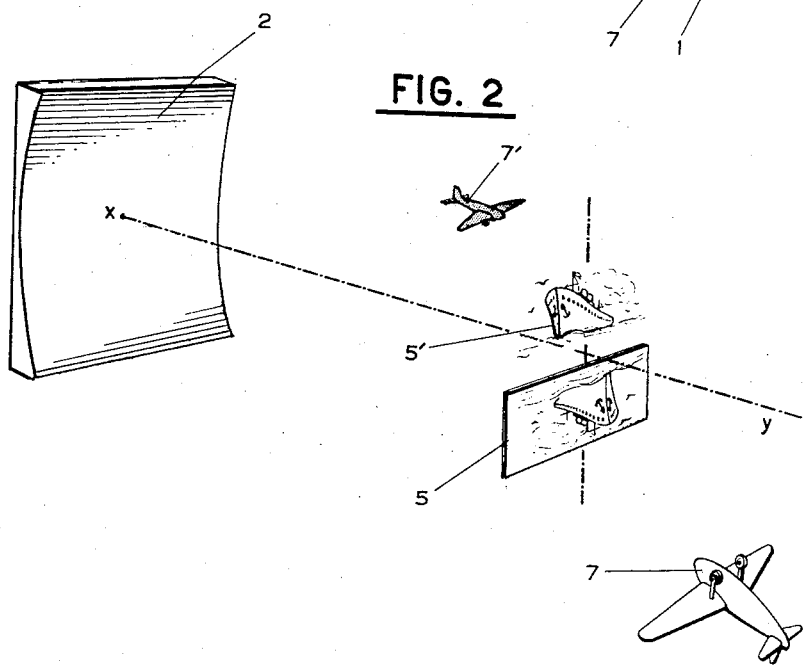

An apparatus as just defined may be embodied in a wide variety of ways. Merely as an illustration of some possible embodiments of the invention and without in any way intending to restrict the latter's scope, some exemplary forms will be described hereinafter with reference to the accompanying drawings wherein:

Figures 1 and 2 relate to a first embodiment, Figure 1 being a vertical section through the apparatus assembly while Figure 2 is a perspective view showing the general effect obtained thereby.

Figure 3:
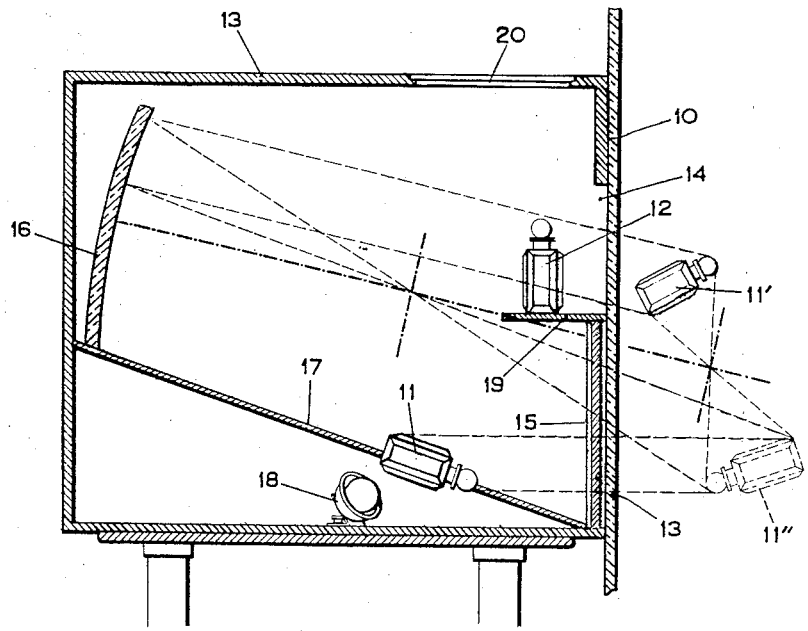
Figure 4:
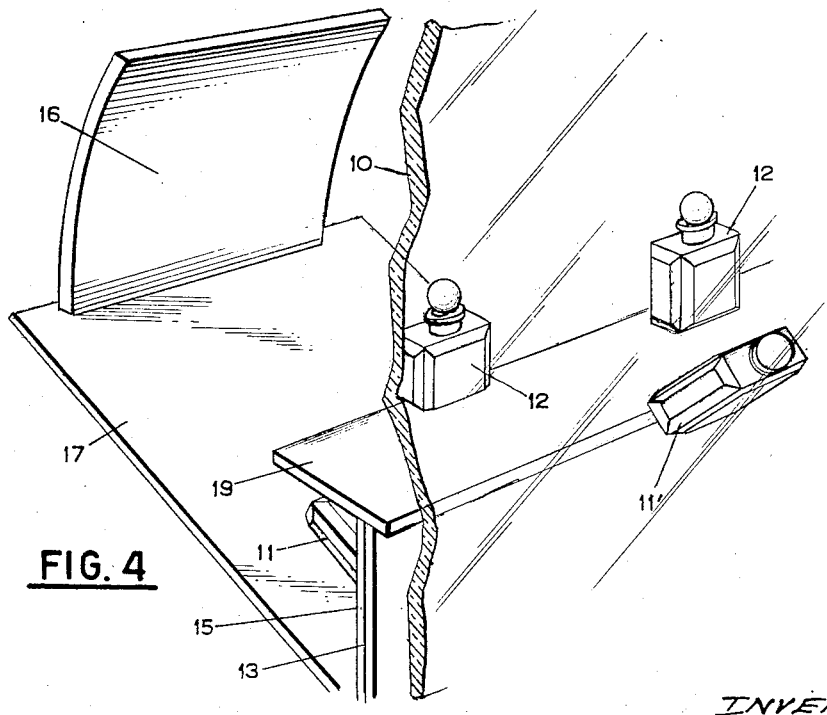

Figures 3 and 4 correspondingly relate to a modified form of the invention.

As shown in Fig. 1, my improved projection apparatus comprises a light box or casing 1 and a concave mirror 2 arranged outside the box at a suitable distance therefrom. The box is closed on all sides except on that facing the mirror 2. A frame 4 which, in the example shown, is arranged at the top end of the said open side of the box, receives therein a device 5 which may take the form of any suitable picture or image carrier and which in the example shown represents a ship. The picture 5 is illuminated by a source of light such as an electric bulb 6 as shown. At the bottom of the box there is arranged an object which may be stationary or movable and is herein shown to be a model airplane 7 adapted to be illuminated from another source of light 8 having a reflector 9 associated therewith.

When the light sources 6 and 8 are on, the mirror 2 (see Fig. 1) will form so-called aerial images 5' and 7' of the objects 5 and 7 respectively (also see Fig. 2). The images thus formed are bright and clear but are inverted (from left to right and vice versa, whereby for instance reading matter will be illegible) and a further and more serious shortcoming is that the position of said images in space relatively to the mirror and to the object prevents certain particularly desirable applications of the apparatus to be described.

Thus, returning to the above-given Formulae 1 and 2, it will be noted that the aerial images produced by a concave mirror may generally be divided into three classes as follows:

1. The image $i$ is equal in size to the object $o$ placed in front of the mirror when the object is at a distance $p$ equal to the radius of the mirror ($R=2f$);

2. The image $i$ is smaller than the object $o$ when the object is at a distance $p$ greater than the radius R: the image is then brought closer to the mirror;

3. The image $i$ is larger than the object $o$ when the object is situated at a distance $p$ from the mirror, smaller than R but larger than $f$: the image $i$ is then moved away from the mirror.

In the first two instances, the image occurs between the object and the mirror. It is bright and in vivid relief; it is impossible for an observer, however, to move forward beyond the material object obstructing his path and to come close to the image.

In the third case on the other hand the enlarged image forms in front of the object but it is less clear and less bright and requires to be viewed with a certain perspective, or from a distance.

In the first two events moreover the dimensions of the apparatus will have to be large if it is desired to conceal from the observer's view the illuminated object of which an aerial image is produced. The box I should then be greater in depth than the radius of the mirror.

This requirement of imparting large dimensions to the box is a very grave shortcoming where the invention is to be applied for display or advertising purposes, a particularly advantageous use of the invention, and where the apparatus is arranged within a shop-window or the like. In such case the large size of the apparatus will sometimes be absolutely prohibitive to its practicability, as in the case where the shop-window is reduced in depth. On the other hand, if it is desired to produce an aerial image forming outside the shop-window, the difficulties mentioned above in connection with the third category of images will be encountered. Thus, if the side-walk on which the shop-window opens is narrow, the aerial image will be practically invisible for the passers-by.

The embodiment of the invention now to be described overcomes the above-mentioned drawbacks and makes it possible to produce very bright aerial images having high relief characteristics and adapted to be formed exteriorly of a shop-window or the like in conditions such as to provide any observer with an almost perfect illusion of reality.

In this preferred modification of the invention, my apparatus is essentially characterized in that it comprises in combination a camera obscura in which are arranged the object or objects from which it is desired to derive an aerial image together with an associated source or sources of light, a (preferably plane) mirror adapted to provide a virtual image of the same object or scene and a concave mirrow adapted to pick up the said image so as to produce therefrom the desired aerial image which then will form in front of said concave mirror at a distance therefrom expressed by the formula:

$$p' = \frac{pf}{p-f}$$

Through the use of such an optical combination of two mirrors which forms an essential feature of the invention, the overall dimensions of the apparatus will be found to be reduced in notable proportions, and the apparatus may then be accommodated within a shop-window of quite moderate dimensions.

The said optical combination furthermore provides the following advantages:

The resulting aerial image is still upside-down; that is not a serious drawback however, since it is merely necessary to place the object to be reproduced upside-down in order to obtain a normally disposed aerial image; however, said image is no longer inverted in a left-right direction, whereby reading matter for instance will become perfectly legible in the aerial image.

On the other hand, the refractive effects which occur in the case of a single concave mirror, for instance of the type including a glass-plate silver-coated on its backside, which effects create a plurality of images in superimposed relation, are herein adapted to be entirely or substantially compensated for through the combined effects of both mirrors, thereby contributing to an improvement in the final aerial image produced.

Moreover, whether the aerial image is equal in side to, smaller than or larger than the object in the box, said image will in every case form in a vertical plane located in the front of the box and consequently in front of the vertical plane extending through the object with respect to the observer. It follows that the observer may come quite close to the image while the latter still remains visible to him and the illusion is thus provoked that the object forming the image can be touched or grasped with the hand.

A final advantage of this modification is as follows: while in the first-mentioned embodiment the only available method of adjusting the aerial image in magnitude and position was to alter the spacing from the mirror to the object, in the embodiment of the invention involving associated mirrors, possibilities are available. Thus, it is possible to vary the spacing from the object to the plane mirror, thereby further removing or bringing closer the image supplied by said mirror, or the spacing between the mirrors may be varied or further the angular inclination of each of said mirrors may be adjusted.

Figs. 3 and 4 diagrammatically illustrate by way of example one embodiment of such improved modification of the apparatus.

As shown in those figures, it is desired to display an aerial image 11' of a flask or the like 11, said image being formed outside the shop-window and for an observer standing in front of the window, the image appears to form between two real objects, shown herein as two flasks 12, 12 arranged within the shop-window.

The apparatus as shown essentially comprises a camera obscura or casing 13 which is entirely sealed except for a window 14 formed in its front side, a combination of mirrors 15 and 16, a stand 17 for the object 11, a light source 18 and a shelf 19 which serves both as a screen concealing the object or scene 11 from the observer's view and also if required as a support for objects such as 12 to be displayed together with the aerial image 11'.

The mirror 15 is a plane mirror and is arranged against the inner front side of the casing 13, extending from the bottom-wall of said casing up to the shelf 19.

The mirror 16 is a concave mirror and is secured at a suitable angle from the rear side of the casing to face the window 14. The mirror 16 may be adjustable both in vertical and longitudinal (front and back) positions and in angular inclination.

The object 11 from which it is desired to obtain an aerial image is carried by the support 17. Where the object is transparent as in the example shown in which a crystal flask or the like is to be displayed, said object may be inserted in the support 17 and illuminated from the bottom by means of a light source 18. The support 17 extends in a forward direction as far as the base of the plane mirror 15 and in a rearward direction up to the base of the concave mirror 16. Where the object to be displayed is made of opaque material, it will be illuminated by back reflection with suitably disposed light sources adapted to impart a desirable relief effect thereto. Illumination may also be provided by means of sunlight and for this purpose openings may be provided in the walls of the casing 13, said openings being preferably closed by means of ground-glass plates and provided with shutter means to seal them when not in use. Said openings are formed in the upper wall, as shown at 20 in Fig. 3, and in the sides of the casing (not shown).

In any case, illumination of the object is so effected that the mirrors will not be directly illuminated in order to avoid the formation of objectionable side-reflection effects.

The manner of operation of this form of apparatus will be readily understandable from Fig. 3.

The mirror 15 forms a virtual image 11'' of the object 11, at a distance from said mirror equal to the distance from the object 11 to said mirror. The image 11'' is picked up by the concave mirror 16 and reflected thereby to form the desired aerial image 11', so that the net effect is the same as if the object 11 were located at 11'. It follows that as a result of the described combination of a plane with a concave mirror, the apparatus is adapted to provide an aerial image formed in front of the object and, in the specific example shown, in front of the plane 10 of a shop-window in which the apparatus is mounted, while its general dimensions are substantially smaller than these of the first described embodiment shown in Figs. 1 and 2.

The aerial image thus formed is very bright and the resulting effect is extremely attractive, especially if objects such as flasks 12 are placed on the shelf 19. An observer, when moving past the apparatus, will then see the said flask 12 (beyond the window-pane 10) together with the aerial image 11' (in front of the pane) and he can come as near as he likes to said image, while retaining the illusion that he can grasp it in his hand; when he moves off in a lateral direction however the aerial image will vanish.

This last-mentioned feature may form a drawback in the case of an apparatus arranged in a shop-window, inasmuch as the attention of the passers-by will fail to be attracted since the aerial image remains invisible while they are approaching the window, in a direction parallel thereto. According to an aspect of the invention this drawback may be overcome in either one of the following ways:

A material object may be arranged outside the window under the location where the aerial image forms so as to attract the passer's-by attention and instigate him to look at the shop-window squarely after he has reached a point opposite to said object which may, for instance, take the form of a tray or a hand appearing to hold the aerial image.

Or alternatively further concave mirrors may be arranged on each side of the mirror 16 at such an angle as to produce on each side of the image 11' further aerial images which are visible to an observer moving past the window.

Obviously, while the object to be displayed has been shown as a flask, objects of any desired type whatever can be used in connection with the device. Thus in particular a model of an aircraft or a ship could be used. A very attractive effect may then be secured by arranging upon the shelf 19 scenery representing in the case of an airplane for instance the buildings of an airport so as to produce a diorama, with airplane models placed on the shelf to represent grounded machines, while the aerial image may represent an airplane in the act of landing or taking-off.

In further modifications of the invention, means may be combined tending to render the results still more attractive while more efficiently catching the eye of a person walking transversely to the general direction of the beam of light producing the aerial image.

Such results may be obtained by applying any one or both of the following means:

1. The aerial image may be provided movable as described above, motion of the image being obtained by imparting movement to the material object whose aerial image is projected through the mirror system described. To thus move the object, any suitable mechanical device may be used, adapted to impart to the object a suitable displacement. Such displacement may be effected in a transverse plane only, in which case the aerial image will appear to move towards the right and left in a direction reverse from that in which the object is moving. Or the object may be moved front to back and vice versa in which case the aerial image will form at a distance varying depth-wise and will also vary in size, and the image will then provide an observer, in those periods where it appears to move towards him, with the same impression as that produced by a "close-up" as seen on a moving-picture screen or further the object may be moved both transversely and depth-wise, the object being for instance caused to follow a path in the form of an elongated ellipsis. In all cases the plane in which the material object is caused to move is so determined as to ensure that the aerial image formed thereby will at all times retain uniform clearness.

2. Alternatively, reference marks formed by material objects, images or scenery may be displaced. This will provide particularly attractive effects both because of the degree of illusion produced on an observer and from the standpoint of the efficiency of the means used to attract the observer's attention when moving towards the apparatus laterally.

Such movable reference marks or indicia are preferably arranged in different planes, thus enabling the observer to locate the aerial image more definitely in the air and facilitating visual accommodation.

It will be particularly desirable to arrange the movable indicia in different planes as just stated and in surrounding relationship with the image enclosed by them.

Thus, for instance, said indicia may be formed by objects caused to swing or to move in any desired manner along the sides or above the aerial image, care being of course exercised to arrange them in such a way that they will never obstruct the path of the light-beam producing the image.

Thus, for instance, where it is desired to display an airplane in the air, it would be possible to feed a translucent and suitably illuminated strip above the image, said strip representing clouds and perhaps airplanes of smaller size than that of the image.

In such conditions the moving image of the airplane will stand out in front of this moving diorama and will seem to move in the opposite direction therefrom. Laterally arranged sceneries or dioramas representing landscapes, buildings, an aerodrome, etc. may be provided to complete the background and serve as additional reference marks.

Finally, among other means which may be combined with the projecting device to attract attention of the passers-by, this invention contemplates the use of a number of translucent plates supporting images or reading matter thereon, or further photographic plates in black and white or in colour, arranged around the point where the aerial image is formed behind a framing system comprising mirrors of a known type in which the silvering is transparent in character when strongly illuminated from behind while remaining reflective when illuminated from the front. With such translucent plates there may be associated individual lighting means arranged behind each of the plates, and a switch of known construction adapted to turn the lamps illuminating said various plates on and off in succession and with any desired order of sequence which may moreover be alterable at will. The effect thus obtained will necessarily attract the attention of passers-by since the pictures surrounding the aerial image will be successively displayed to him and his attention will necessarily be directed to the aerial image itself, thus obtaining the desired result.

The effects obtainable by means of the invention are practically unlimited in number and it will of course be understood that the invention is in no way restricted to the examples specifically mentioned nor to the details of practical embodiment described and illustrated, and various alterations may be made therein without departing from the spirit and scope of the invention as defined in the ensuing claims.

What I claim is:

1. A display device for displaying an aerial image of an object; comprising a box-like casing having a front opening therein elevated from the bottom of the box, a mirror extending vertically in the front of the box and below the opening, a stand in the bottom of the box adapted to support the object to be displayed, a concave mirror disposed in the rear of the box-like casing partly above the front opening and with its focal axis extending through the front of the casing just below the opening, and means for directing light rays upon the object.

2. A display device for displaying an aerial image of an object; comprising a box-like casing having a front opening therein elevated from the bottom of the box, a mirror extending vertically in the front of the box and below the opening, a stand in the bottom of the box adapted to support the object to be displayed, a concave mirror disposed in the rear of the box-like casing partly above the front opening and with its focal axis extending through the front of the casing just below the opening, and means for directing light rays upon the object, and a shelf barrier extending into the casing from the front wall thereof at the bottom of the front opening to keep the object from the observer's view.

3. A display device for displaying an aerial image of an object; comprising a box-like casing having a front opening therein elevated from the bottom of the box, a mirror extending vertically in the front of the box and below the opening, a stand in the bottom of the box adapted to support the object to be displayed, a concave mirror disposed in the rear of the box-like casing partly above the front opening and with its focal axis extending through the front of the casing just below the opening, and means for directing light rays upon the object, and said stand comprising an inclined member with its lower end in the front of the casing and its elevated end at the rear thereof, said inclined member having an opening therein for receiving the object which may be transparent, and a light source under the inclined member, said means for directing light rays comprising a lamp located in the bottom of the casing and directing its rays through the opening in the inclined stand member and through the transparent object thereof, and a shelf barrier extending horizontally from the front of the casing at the lower edge of the opening to conceal the object and the lamp.

FERNAND SAUVAGÉ.

REFERENCES CITED

The following references are of record in the file of this patent:

UNITED STATES PATENTS

| Number | Name | Date |
| --- | --- | --- |
| 922,722 | Salle | May 25, 1909 |
| 1,065,845 | Sauvage | June 24, 1913 |
| 1,699,689 | Curry | Jan. 22, 1929 |